C. LONG.
Corn-Planter.
No. 60,914. Patented Jan. 1, 1867.
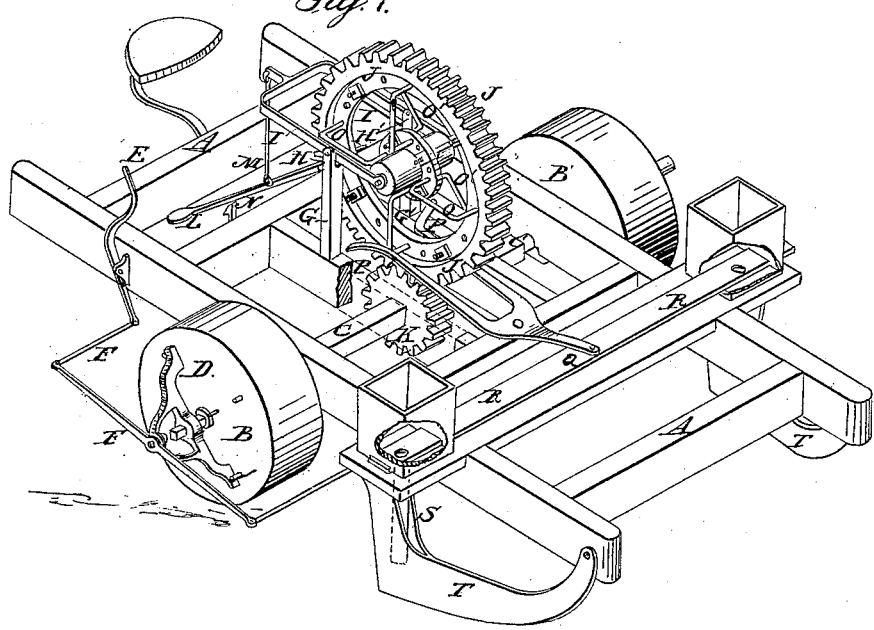
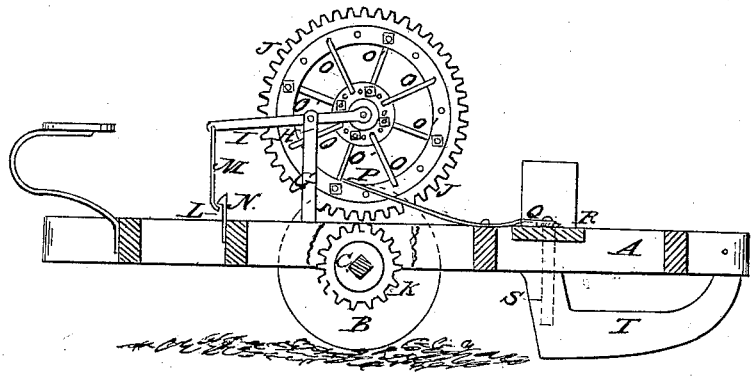

United States Patent Office.

CHARLES LONG, OF PARIS, ILLINOIS.

Letters Patent No. 60,914, dated January 1, 1867.

IMPROVEMENT IN CORN PLANTERS.

*The Schedule referred to in these Letters Patent and making part of the same.*

TO WHOM IT MAY CONCERN:

Be it known that I, CHARLES LONG, of Paris, Edgar county, Illinois, have invented a new and useful Machine for Planting Corn or other seeds in check-rows or hills; and I do hereby declare the following to be a full, clear, and exact description thereof, reference being had to the accompanying drawing, making a part of this specification.

My invention belongs to the class of seed-planting machines adapted to be drawn along the ground by horse or other animal power, and to deliver the grain at stated distances and quantities by automatic connection of the grain-dropper and the ground-wheel; and my invention consists chiefly in a mechanical device within plain view and under immediate control of the husbandman, whereby the grain-dropper may be momentarily and accurately set in or out of motion.

Figure 1 is a perspective view of a machine embodying my invention.

Figure 2 is a longitudinal section of the same with seed-dropping mechanism disengaged.

A is a frame, supported on ground-wheels B B', of which wheels both are loose upon the axle or shaft C, but of which one wheel, B, is capable of being coupled to the said axle by means of a clutch, D, that at the option of the operator is placed in or out of lock by means of a lever E and rods F. Standards G G' upon the frame, contain studs or pivots H H', upon which is balanced a yoke, I, in whose short arm is journalled a cog-wheel, J, which at the option of the operator meshes into and is driven by a pinion, K, upon the axle. L is a lever, connected by rod M with the long arm of the yoke I, and which, when the operator desires to discontinue the planting operation, is depressed and engaged under the catch N, so as to lift and hold the cog-wheel J out of mesh with the pinion K. Lugs O O', which project alternately and at equal distances from the two sides of the cog-wheel, strike as said wheel revolves with an alternate action against the respective arms P P' of a forked lever, P P'' Q, which reciprocates a seed-dropper R of any suitable construction. The grain drops through tube S into a furrow temporarily created by the advance of the runner T, and is covered by the passage of the wheels B B'. It will be seen that the motion of the wheels along the ground is communicated to the dropping mechanism by a positive system of movements which are entirely free from slip and other irregularities.

I claim herein as new, and of my invention—

1. The arrangement of cog-wheel J, balanced on yoke I, and engaging with pinion K, (upon the ground-wheels axle,) at the option of the husbandman, by means of lever L, rod M, and catch N, substantially as and for the purposes set forth.

2. The combination in a power corn planter of the frame A, wheels B B', engaging and releasing mechanism E F, the whole being combined with the elements of the preceding clause in the manner set forth.

In testimony of which invention I hereunto set my hand.

CHARLES LONG.

Witnesses:
GEO. H. KNIGHT,
JAMES H. LAYMAN.